Figure 1:
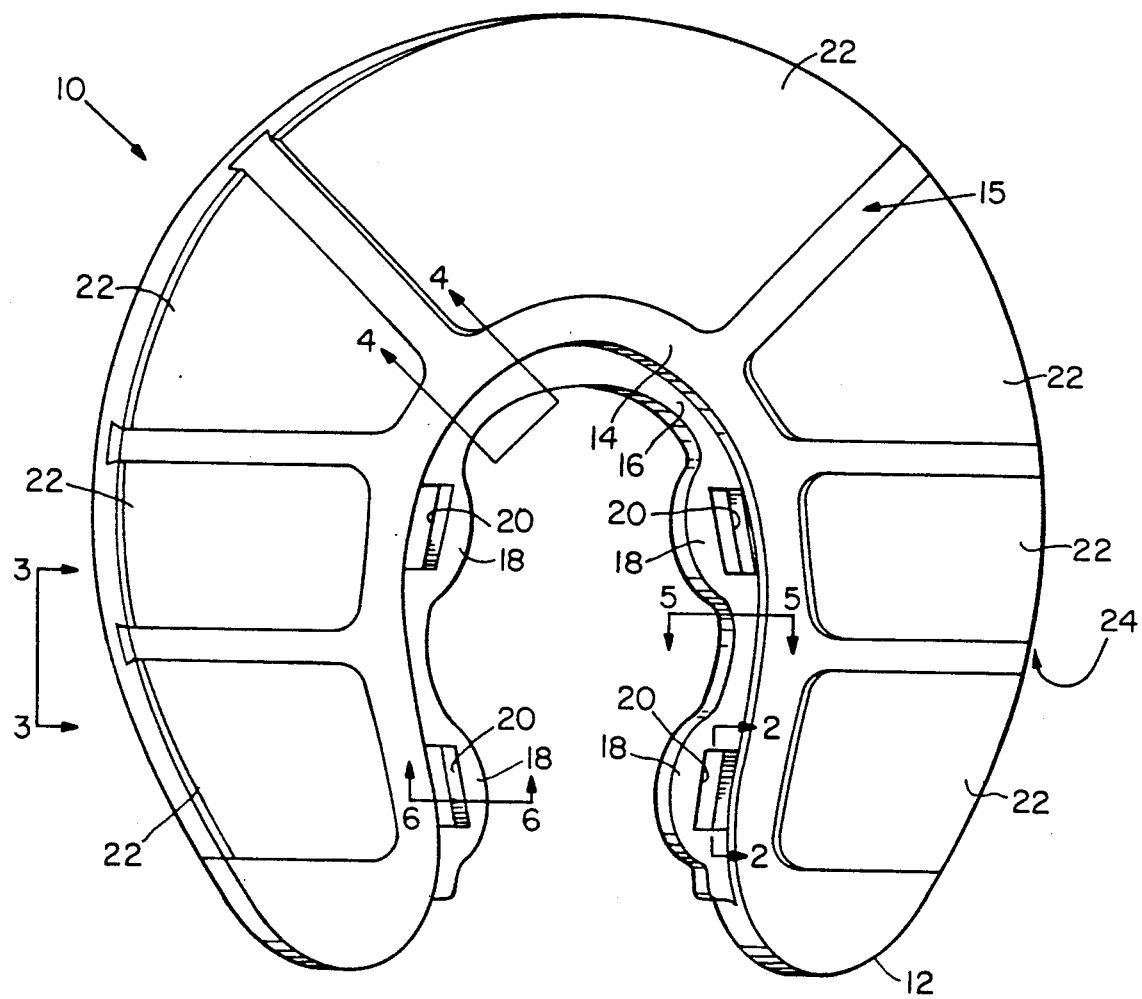

United States Patent [19]

Fox et al.

[11] Patent Number: 5,042,585
[45] Date of Patent: Aug. 27, 1991

[54] HOOFED-ANIMAL SHOE PAD WITH INSERT

[76] Inventors: Alfred E. Fox, P.O. Box 231, Newton, Mass. 02166; James B. Boulton, 16 Kingsview Rd., Marlborough, Mass. 01752

[21] Appl. No.: 410,922
[22] Filed: Sep. 22, 1989
[51] Int. Cl.⁵ .......................... A01L 1/00; A01L 5/00
[52] U.S. Cl. ......................................... 168/27; 168/28
[58] Field of Search .................... 168/14, 26, 27, 28

[56] References Cited

U.S. PATENT DOCUMENTS

| 189,517 | 4/1877 | Stockder | 168/27 |
| 439,537 | 10/1890 | Mellen | 168/27 |
| 576,522 | 2/1897 | Thomas | 168/27 |
| 660,023 | 10/1900 | Nichols | 168/27 |
| 677,398 | 7/1901 | Buer | 168/26 |
| 3,494,422 | 2/1970 | Clark | 168/4 |
| 4,420,046 | 12/1983 | Chaplin | 168/14 |
| 4,503,914 | 3/1985 | Voland | 168/18 |
| 4,513,825 | 4/1985 | Murphy | 168/12 |
| 4,605,071 | 8/1986 | McKibben | 168/12 |

FOREIGN PATENT DOCUMENTS 192174  1/1923  United Kingdom ............. 168/14

Primary Examiner—Robert P. Swiatek
Attorney, Agent, or Firm—Fish & Richardson

[57] ABSTRACT

A plastic, removable insert unit for use with an arched horseshoe pad or a horseshoe, the insert unit including a substantially flat region and locking elements for attaching the insert to the horseshoe pad or to the horseshoe, wherein when the insert unit is attached to the horseshoe pad or to the horseshoe, the substantially flat region fits within the arch of the horseshoe pad or the horseshoe and substantially fills the arch is disclosed.

10 Claims, 3 Drawing Sheets

HOOFED-ANIMAL SHOE PAD WITH INSERT

BACKGROUND OF THE INVENTION

This invention relates to inserts for horseshoes or horseshoe pads.

Full hoof horseshoes or full hoof horseshoe pads used with conventional horseshoes can be employed to hold medication or a treatment product adjacent to the frog area of a horse's foot. To check the appearance of the frog area or to change the medication, the full horseshoe, or horseshoe and pad combination, are removed from the horse's hoof, the appropriate inspection or treatment is made, and the horseshoe or horseshoe and pad are reapplied.

SUMMARY OF THE INVENTION

In one aspect, the invention features a plastic, removable insert unit for use with an arched horseshoe pad or a horseshoe, the insert unit including a substantially flat region and means for attaching the insert to the horseshoe pad or to the horseshoe, wherein when the insert unit is attached to the horseshoe pad or to the horseshoe, the substantially flat region fits within the arch of the horseshoe pad or the horseshoe and substantially fills the arch.

Stated in other words, there is a plastic removable insert unit having an outer periphery for use with an arched hoofed-animal pad or shoe having an inner periphery. The insert unit has a substantially flat region and first locking elements integral with the insert unit spaced along the outer periphery for attaching the insert to the pad or shoe. The pad or shoe has second locking elements integral therewith spaced along the inner periphery complementary with the first locking elements for mating locking engagement with the insert unit first locking elements. When the insert unit is attached to the pad or shoe, the substantially flat region fits within and substantially fills the inner periphery with the insert unit first integral locking elements in locking engagement with the second integral locking elements while being free of nonintegral fastening elements to lock the insert unit within the inner periphery with similar pairs of locking elements.

In preferred embodiments the means for attaching the insert to the horseshoe pad or horseshoe include a ridge or a plurality of projections extending from the substantially flat region of the insert.

In another aspect the invention features a combination of a horseshoe pad or a horseshoe (which may be plastic) and the insert and means of attaching the pad or horseshoe to the insert. In preferred embodiments the horseshoe pad includes a stiffening member which contains the means for attaching the pad to the insert, and the insert unit is both removable and reattachable.

In another aspect the invention features a method for treating, in a hoofed animal, a condition requiring the application of medication to the interior surface of the foot, the method including the steps of obtaining the insert unit of claim 1, the insert unit having attached to it the medication, attaching the insert unit to a horseshoe pad or to a horseshoe, and attaching the horseshoe pad or the horseshoe to the hoofed animal.

A removable insert for a horseshoe or a horseshoe pad or a combination of the insert with the shoe or pad provides great flexibility for the veterinarian, farrier, or owner in treating conditions of the foot. By using the insert, especially if it is prepackaged with medication, the person treating the horse can save the considerable time that would be required to remove and replace a horseshoe and a hoof pad.

Other features and advantages of the invention will be apparent from the following description and from the claims when read in connection with the accompanying drawings in which:

DRAWINGS

Figure 2:
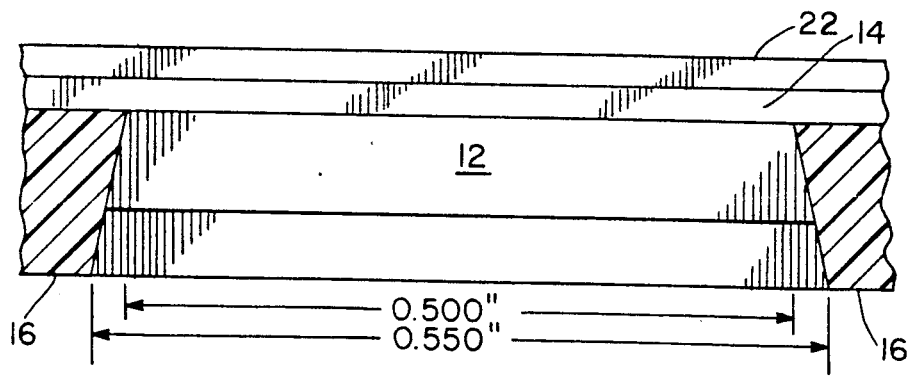
Figure 3:
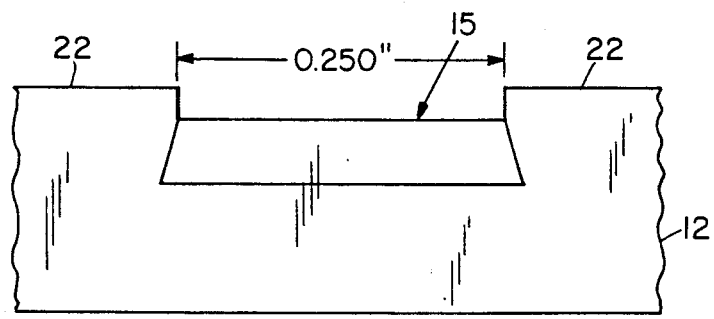
Figure 4:
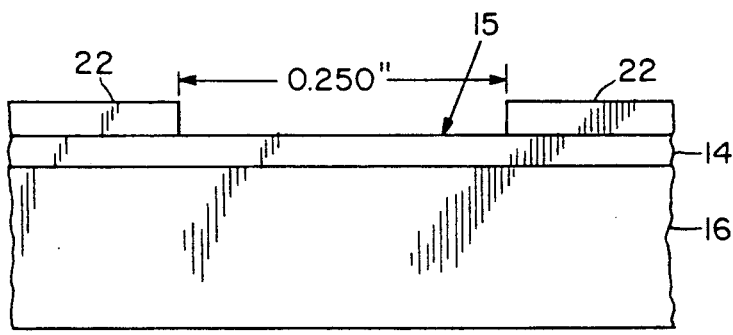
Figure 5:
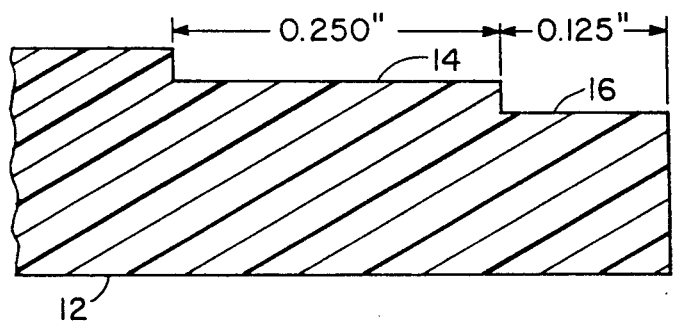
Figure 6:
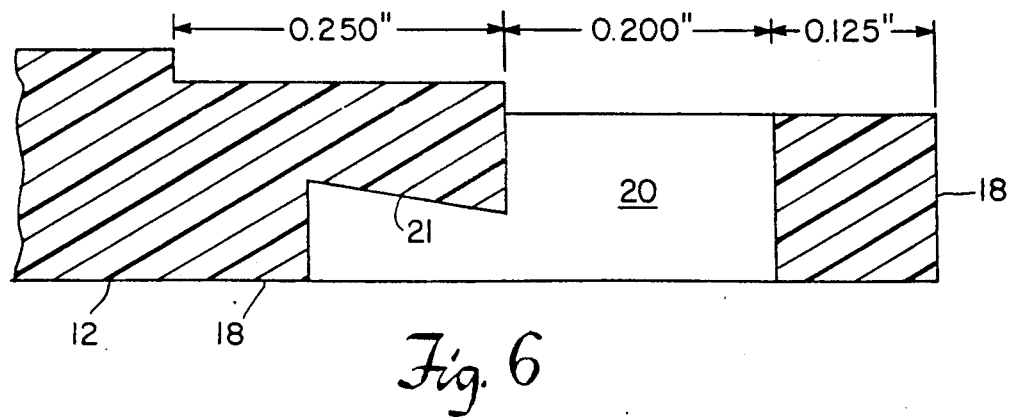
Figure 7:
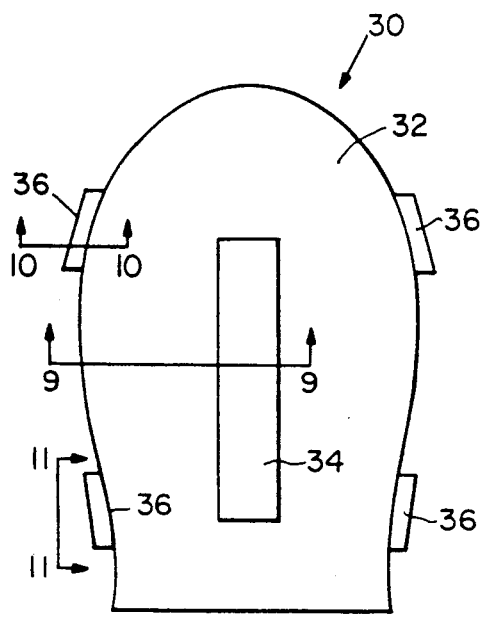
Figure 8:
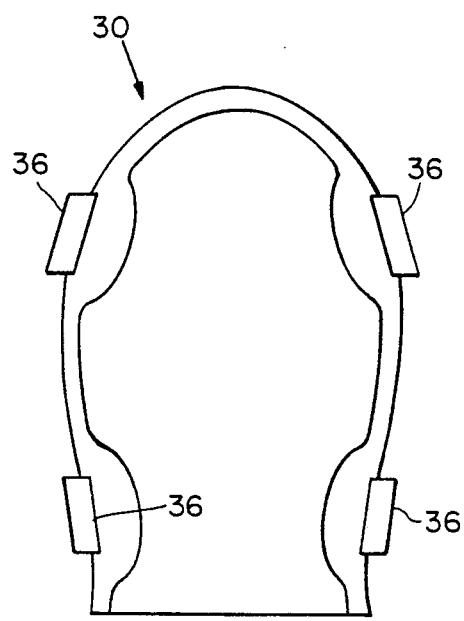
Figure 9:
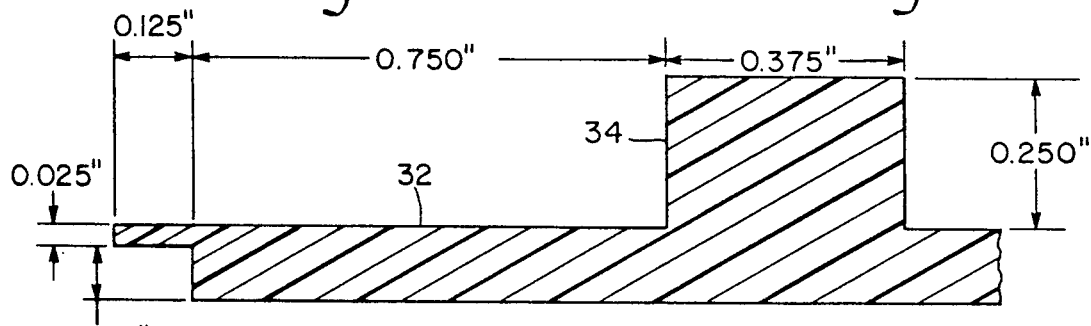
Figure 10:
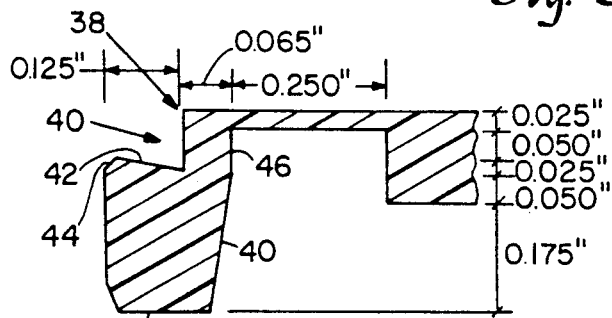
Figure 11:
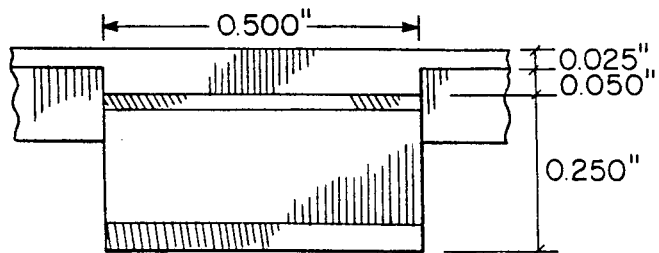

FIG. 1 is a view of the turf side of a medicator horseshoe pad without attached insert.
FIG. 2 is a section at line 2—2 of FIG. 1.
FIG. 3 is a view at line 3—3 of FIG. 1.
FIG. 4 is a view at line 4—4 of FIG. 1.
FIG. 5 is a section at line 5—5 of FIG. 1.
FIG. 6 is a section at line 6—6 of FIG. 1
FIG. 7 is a top view of a medicator horseshoe pad insert.
FIG. 8 is a bottom view of a medicator horseshoe pad insert.
FIG. 9 is a section at line 9—9 of FIG. 7.
FIG. 10 is a section at line 10—10 of FIG. 8.
FIG. 11 is a view at line 11—11 of FIG. 8.

STRUCTURE AND FABRICATION

Referring to FIGS. 1-6, shock absorbing medicator horseshoe pad 10 consists of a primary frame 12 injection molded from a high durometer plastic polymer such as 98A polyurethane (Dow Chemical Corporation). The frame has an interior arched structure 14, functioning as a stiffening member approximately 0.150 inches thick with radially projecting arms 15 which are flush with the top surface of the arched portion 14 and are approximately 0.025 inches thick and 0.250 inches wide. Arms 15 taper outward slightly, from the top, along their length and reach to the outer margins of the formed pad. The interior arch 14 of the frame has on its inner edge a recessed lip 16, 0.125 inches wide and 0.125 inches deep. At four positions 18, the lip widens out to leave room for four rectangular apertures 20, 0.200 inches by 0.500 inches. The interior under surface 21 (FIG. 6) of each aperture 20 is tapered to accept a complementary attaching unit from the separate insert (to be described later).

Primary frame 12 is overmolded with a lower durometer plastic polymer such as 70A polyurethane to create the contact surfaces of the horseshoe pad. The rear surface 24 of the lower durometer material, which is placed in contact with the horse's hoof, is flat, while the upper or turf side surface, which is placed in contact with an affixed horseshoe, contains symmetrical, raised areas 22, each of which extends approximately 0.025 inches above the upper surface of the radial arms 15 of the primary frame 12 and the exterior margin of its central arch 14.

Referring to FIGS. 7-11, medicator horseshoe pad insert 30, for insertion within arch 14 of the primary frame, is injection molded with a suitable plastic polymer such as a high density polyurethane, polyvinylchloride, polyethylee or polypropylene. The insert has an exterior configuration complementary to the outline of the interior lip 16 of the primary frame. The upper surface 32 of the insert contains a centrally positioned handle 34. Extending from the outer margin of the insert are four rectangular projections 36 which are 0.500 inches wide, 0.250 inches deep and extend out from the edge of the insert 0.190 inches. The projections 36 are positioned so as to be complementary to the apertures 20 in the primary frame 12 when the insert unit is placed within arch 14. The upper surface 38 of each projection 36 drops off at 0.065 inches to form notch 40. The lower face 42 of notch 40 is angled upward to be complementary to the angle of the interior surface of aperture 20 in the primary frame. The rear surface 44 of each projection is angled away from the main portion of the insert to the same degree as the lower face 42 of notch 40 is angled upward.

Method of Operation

When insert 30 is attached to medicator horseshoe pad 10, projections 36 enter apertures 20 in the primary frame 12 of the horseshoe pad. When pressure is applied to the insert, the outer perpendicular wall 23 of the aperture comes in contact with the angled surface 44 of projection 36, causing surface 44 to straighten out to a vertical position so that it can slide along the aperture wall. This movement causes projection 36 to flex at region 46 which forces surface 42 of notch 40 to move to a horizontal position. As the aperture wall 23 moves past surface 44 and reaches vertical region 46 of projection 36, the distorting pressure on the projection ceases, and projection 36 returns to its original configuration as it slips up under the angled edge of aperture 20. With the connection of all four projections 36 into the four apertures 20, insert 30 is securely fixed within the arch 14 of the horseshoe pad. For removal of the insert, bar 34 in the center of the insert is firmly grasped, e.g. with pliers, and a uniform upward force is applied which causes the insert to bow. The consequential upward stresses on the connecting arms of each projection 36 cause them to swing backward and bring the rear angled surfaces of the projections into contact with the respective perpendicular rear aperture surfaces. This action releases the contacting front angled surfaces and allows simultaneous removal of the projections 36 from associated apertures 20.

Use

A shock absorbing horseshoe pad with attached medicator pad insert permits easy application or removal of medicating substances to treat conditions such as inflamation of the frog, hoof damage or diseases or inflamation of the interior surfaces of the hoof, or for routine examination of the interior area of the foot. In addition, a pad with attached insert can be used to cover a horse's foot completely during transportation, and then the insert can be easily removed prior to competition. Medicator pad inserts may be provided in the appropriate shock absorbing horseshoe pad or may be packaged with medication and dispensed separately for one-time application.

Other embodiments are within the following claims. For example, any kind of horseshoe pad or horseshoe can be constructed so as to be able to receive an insert. The effectiveness of the insert is not limited by any method of attachment to the pad or horseshoe. Other attachment combinations include the use of an insert and a threaded receptacle, a bead and an expandable hole, or a ridge and a groove. Alternatively, the insert can be slid into a groove in the interior arch of a horseshoe or pad and locked in place. The attachment means must secure the insert to the horseshoe or pad sufficiently firmly that the insert will not be pulled off by the local vacuum created when a horse walks or runs on wet turf or in mud. If the combination of the pad and the insert together provides the necessary rigidity for attaching and securing the insert, structural reinforcement in the pad is not necessary. The insert can be injection or pour molded or die cut from a sheet of the appropriate plastic material.

We claim:

1. A plastic, removable insert unit having an outer periphery for use with an arched hoofed-animal shoe pad or a shoe having an inner periphery, said insert unit comprising, a substantially flat region, and first locking elements integral with said insert unit spaced along said outer periphery for attaching said insert unit to said show pad or to said shoe, said shoe pad or said shoe having second locking elements integral therewith spaced along said inner periphery for mating locking engagement with the insert unit first locking elements and complementary with said first locking elements, wherein when said insert unit is attached to said shoe pad or to said shoe, said substantially flat region fits within and substantially fills said inner periphery with said insert unit first integral locking elements in locking engagement with said second locking elements and being free of nonintegral fastening elements to lock said insert unit within said inner periphery with similar pairs of locking elements.

2. The insert unit of claim 1 wherein said first locking elements comprise at least one projection extending from said substantially flat region.

3. The insert unit of claim 2 wherein said first locking elements comprise a plurality of projections.

4. The insert unit of claim 1 wherein said first locking elements comprise a ridge extending from said substantially flat region.

5. The insert unit of claim 1 and further comprising a hoofed-animal shoe, said shoe having said second locking elements for attaching said shoe to said insert unit.

6. The combination of claim 5 wherein said shoe comprises plastic.

7. In combination, a molded plastic, removable insert unit having an outer periphery and an arched hoofed-animal shoe pad having an inner periphery, said insert unit comprising, a substantially flat region, and first locking elements integral with said insert unit spaced along said outer periphery for attaching said insert unit to said shoe pad, said shoe pad having second locking elements integral therewith spaced along said inner periphery for mating locking engagement with and complementary with said first locking elements, wherein when said insert unit is attached to said shoe pad, said substantially flat region fits within the arch of said shoe pad and substantially fills said inner periphery with said first and second locking elements in locking engagement and being free of nonintegral fastening elements to lock said insert unit within said periphery with similar pairs of locking elements.

8. The combination of claim 7 wherein said pad further comprises a stiffening member and said member comprises means for attaching said pad to said insert unit.

9. The combination of claim 7 or 5 wherein said insert unit is both removable and reattachable.

10. A method for treating in a hoofed-animal a condition requiring the application of medication to the interior surface of the foot, said method comprising the steps of applying medication to an insert unit, attaching said insert unit to an arched shoe pad or to an arched shoe with said insert unit substantially filling the arch of said shoe pad or shoe so that with said shoe pad or said shoe attached to the foot of said hoofed animal said medication carried by the medicated insert may engage the foot of said hoofed animal to provided said medication to the interior surface of said foot through said foot, wherein said insert unit has an outer periphery with a substantially flat region and first locking elements integral with said insert unit spaced along said outer periphery for attaching said insert unit to said shoe pad or to said shoe with said arched shoe pad or arched shoe having an inner periphery and second locking elements integral therewith spaced along said inner periphery for mating locking engagement with the insert unit first locking elements and complementary with said first locking elements and wherein said step of attaching said insert unit to said arched shoe pad or to an arched shoe with said insert unit substantially filling the arch includes the step of lockingly engaging said first locking elements and said second locking elements to lock said insert unit within said periphery with similar pairs of locking elements.

* * * * *